United States Patent

[11] 3,612,545

| [72] | Inventor | Robert S. Storms<br>Dayton, Ohio |
| [21] | Appl. No. | 735,812 |
| [22] | Filed | June 10, 1968 |
| [45] | Patented | Oct. 12, 1971 |
| [73] | Assignee | The Duriron Company, Inc.<br>Dayton, Ohio |

[54] RESTRAINER RING SEAL ASSEMBLY
10 Claims, 5 Drawing Figs.

[52] U.S. Cl.................................................. 277/26,
277/162, 277/198
[51] Int. Cl..................................................... F16j 9/00,
F02f 5/00
[50] Field of Search......................................... 277/26,
222, 162, 177, 176, 198, 188, 216, 195, 59

[56] References Cited
UNITED STATES PATENTS

| 3,149,543 | 9/1964 | Naab.............................. | 277/188 X |
| 3,259,392 | 7/1966 | Peickii et al. ................... | 277/177 X |
| 3,390,889 | 7/1968 | Grover........................... | 277/198 |
| 3,100,648 | 8/1963 | Lee et al. ....................... | 277/59 |
| 3,277,797 | 10/1966 | Tyree et al..................... | 277/26 X |
| 3,455,565 | 7/1969 | Jepsen........................... | 277/156 |

OTHER REFERENCES
Journal of Teflon –Vol. 6, No. 6 – Aug. 1965 (pages 4– 7)
Piston Ring Seals of Teflon – by H. A. Traub

*Primary Examiner*—Samuel B. Rothberg
*Attorney*—Marechal, Biebel, French & Bugg

ABSTRACT: A seal assembly for a shaft movable relative to a housing includes a filled polytetrafluoroethylene (PTFE) seal element and a split restrainer ring received in a groove on the shaft, the restrainer being received in an annular chamber formed between the base of the groove and the inner periphery of the seal element. The restrainer ring keeps the seal element in engagement with the housing as the temperature is reduced by contracting until the spaced free ends are in abutting relation preventing further contraction of the ring and the seal element.

INVENTOR
ROBERT S. STORMS
BY
Marechal, Biebel, French & Bugg
ATTORNEYS

RESTRAINER RING SEAL ASSEMBLY

Reference is made to application Ser. No. 735,811, filed of even date herewith and assigned to the same assignee.

BACKGROUND OF THE INVENTION

This invention relates to a seal assembly and more specifically to an improved seal assembly for use over a wide temperature range.

The use of fluorocarbon resins as seal elements is well known. Commonly used materials are polytetrafluoroethylene and tetrafluoroethylene and hexafluoropropylene copolymers. The seal element, be it an O-ring or flat gasket-type ring or lip seal is usually urged into sealing engagement by a resilient energizing member, and the seal element usually substantially completely fills the groove or recess in which it is received.

One of the problems associated with the use of fluorocarbon seal elements is the relatively high coefficient of linear thermal expansion. For example, unfilled PTFE has a coefficient of $5.5 \times 10^{15}$ in./in./° F., in the range of 73° F., to 140° F., in the case of the copolymer, the value is 4.6 to $5.8 \times 10^{15}$ in./in./° F., over the same temperature range. Using fillers reduces the effective coefficient to a value between about 3.8 to $4.5 \times 10^{15}$, for example. Thus, PTFE has a coefficient about 10 times that of most grades of steel. In those instances in which the part is to be exposed to wide variations in temperature, e.g., −40° F., to 350° F., the lineal growth per inch over that range of temperature is about 0.0215 inch. For a seal element of 2 inches outside diameter, the total lineal growth over the range is 0.136 inch, or 0.043 inch radially for the range.

The difficulties associated with change in dimension of PTFE parts is further compounded by the fact that the linear coefficient of expansion varies for different temperatures, e.g.

From this data it becomes clear the rate of growth over the range of 68° F., to 77° F., is significantly higher than the remaining range of temperature. The lineal growth over that range is 0.0039 inch per inch. Therefore, the same seal element supra, has a lineal growth of 0.0285 inch in the range of 68° to 77° F., corresponding to a radial change of 0.0079 inch. This data is significant because it shows that cooling a 2-inch seal element from 77° F., to 68° F., the radial shrinkage is approximately 0.008 inch.

One approach to limiting the effect in changes of seal dimension has been to confine the seal element over the entire range of temperatures so that the seal is unable to move. While such designs are effective, they are also complicated and expensive thus limiting the use of PTFE to those installations in which no other material will operate satisfactorily.

Another approach has been to proportion the seal element so that it seals efficiently at lower temperatures, and as the temperature increases, the dimension of the seal increases, and in some instances deforms or is wedged between the surface to be sealed so that it cannot contract as the temperature is reduced. Ultimately, such a seal becomes inefficient even at the higher temperature.

A typical example of a seal arrangement exposed to wide variations in both temperature and pressure is the internal seals for hydraulically controlled automatic transmissions for automobiles and the like. The basic elements of a transmission of this type are: (1) a hydraulic torque converter, (2) a planetary gear set, (3) multiple disk clutches, (4) sprag clutches, (5) bands, and associated valves, pumps and control elements for flow of hydraulic fluid which controls the transmission operation. The hydraulic pressure may vary from zero to almost 200 p.s.i. while the temperature may vary from −40° F., to 350° F. Within the transmission there are several seals, with adjacent seals defining the hydraulic flow path to various elements of the transmission. For example, there are two seals between the front plate of the pump assembly and the forward clutch to control operation of the forward clutch, and four seals forming three passageways between the support housing for the intermediate clutch and sprag and the direct clutch housing. THese three passages control operation of the direct clutch, the front band and the intermediate sprag.

Currently, the seals used are split metallic rings which permit some leakage of fluid, but which are sufficiently tight to effect operation of the various clutches, bands and sprags. Since there is some loss of pressure, the pump used to supply the pressure must be sufficiently large to provide the various pressures in addition to the pressure lost through seal leakage.

SUMMARY OF THE INVENTION

In accordance with the present invention, a relatively simple seal assembly is provided which overcomes some of the difficulties associated wit the use of PTFE in seal assemblies, and which is effective as a sealing element without the use of an energizing member and operates over a wide range of temperatures. Seal assemblies of the present invention are particularly useful in hydraulically controlled automatic automotive transmissions wherein the hydraulic fluid to be sealed operates as the energizing medium to establish a sealing relation through the seal element.

The seal assembly of the present invention includes a seal element of PTFE material which is in the form of a continuous annular disk having spaced radial faces, the outer periphery of the disk forming the sealing face. The seal element is received in a groove on the shaft, the inner peripheral dimension thereof being sufficiently larger than the peripheral dimension of the base of the groove on the shaft to form an annular chamber, the inner periphery of the seal element being spaced from the base of the groove. Received in the chamber is a restraining ring which is split, the free ends thereof being spaced apart at normal ambient temperatures. As the temperature is reduced below ambient, the seal element contracts causing the free ends of the restraining ring to butt thereby preventing further contraction of the seal element. The cross-sectional dimension of the seal element is less than the width of the groove, while the inner periphery of the restrainer ring is spaced from the base of the groove. Thus, as fluid under pressure contacts the seal ring, it forces one radial face of the seal element into engagement with the groove wall, and enters between the inner periphery of the restrainer ring and the groove forcing the seal element outwardly into tight sealing engagement with the housing. The restrainer ring does not itself act as an energizing member but merely as a member transmitting the energy from the fluid which is to be sealed.

Accordingly, it is a primary object of the present invention to provide an improved relatively simple seal assembly which may be energized to provide an efficient seal over a wide variety of pressures.

Another object of this invention is to provide a seal assembly of the type described using a PTFE seal element wherein the seal assembly is particularly useful in hydraulically actuated automotive transmissions of the automotive type.

Other objects and advantages of the present invention will be apparent from the following description, the accompanying drawings and the appended claims.

DETAILED DESCRIPTION OF THE INVENTION

Figure 1:
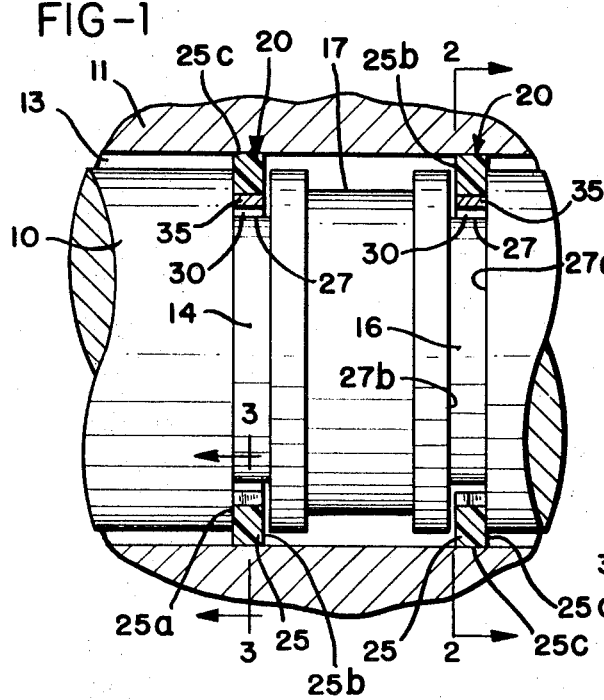
FIG. 1 is a view partly in section and partly in elevation of the seal assembly of the present invention positioned on a rotating shaft.

Referring to FIG. 1, which illustrates a preferred embodiment of the invention, a seal arrangement is shown for a shaft 10 and a housing 11, which are in spaced relationship as indicated by the clearance 13 therebetween. The shaft may be rotatable or it may reciprocate within the housing, and for purposes of explanation, a rotating shaft will be described. The shaft 10 is provided with spaced grooves 14 and 16, with the portion 17 of the shaft between the grooves forming a fluid flow channel. Positioned in each of the grooves 14 and 16 is a seal assembly 20, each of the same construction, although it is understood that the shaft may be provided with only one seal assembly, if a fluid flow channel is not used.

Each seal assembly includes a seal element 25 in the form of a continuous annular fluorocarbon member having spaced radial faces 25a and 25b, the seal member being free of any radial seams or joints. The outer peripheral surface 25c of the seal element is in sealing engagement with the opposed wall of the housing 11. The dimensions of the seal element 25 are coordinated with the dimensions of the grooves 14 and 16 as follows: Each groove has a base 27 of predetermined depth and sidewalls 27a and 27b spaced a predetermined distance apart. The inner peripheral dimension of the seal element is less than the diameter of the shaft 10 and less than that of the passageway 17 but sufficiently greater than the diameter of the base 27 of the groove to form an annular clearance or chamber 30 between the base and the groove and the inner periphery of the seal. Proportioned as described, at least a portion of the radial faces 25a and 25b of the seal elements overlaps a portion of the opposed spaced sidewalls 27a and 27b, respectively, of the groove. The cross-sectional dimension of the seal element, that is, the dimension as measured between the radial faces is less than the cross-sectional dimension or width of the groove as measured between the opposed sidewalls 27a and 27b. Preferably, the cross-sectional dimension of the seal element is at least 50 percent that of the groove to prevent it from cocking or being distorted in the groove. Thus, the seal element is capable of limited lateral movement along the axis of the shaft 10.

Figure 2:
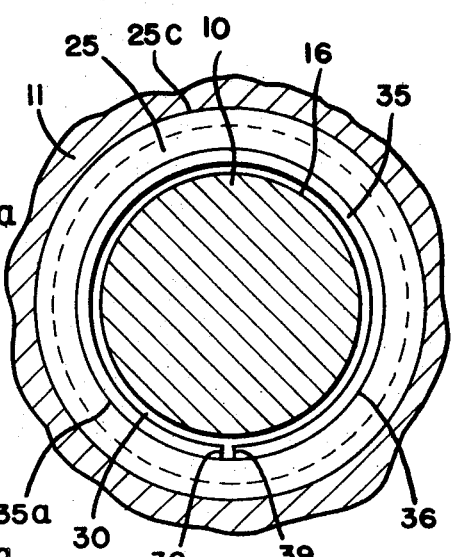
FIG. 2 is a view in section taken along the lines 2—2 of FIG. 1.
Figure 3:
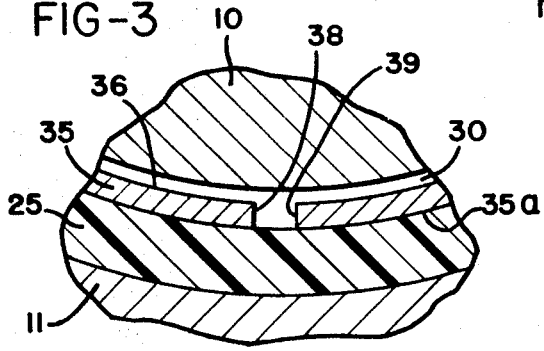
FIG. 3 is an enlarged fragmentary section taken along the lines 3—3 of FIG. 1 showing the end of the restrainer ring in accordance with the present invention.

Received within the chamber 30 and concentrically arranged with respect to the seal element 10 is a generally annular split metallic ring 35 which acts as a restrainer means limiting shrinkage of the seal assembly in response to decreases in temperature from ambient temperature. As shown in FIGS. 2 and 3, the outer peripheral surface 35a of the restrainer ring is in opposed contacting relationship with the inner peripheral surface of the seal element. The inner peripheral surface 36 of the restrainer ring is spaced a predetermined distance from the base 27 of the seal assembly grooves to provide a small clearance therebetween. THe restrainer ring, as previously noted, is split and includes normally spaced circumferentially disposed faces 38 and 39. Contrary to most split rings used in conjunction with seal elements, the restrainer ring does not operate as an energizing member in that it does not urge the seal element into sealing engagement through its own resilient character to any great extent.

Figure 4:
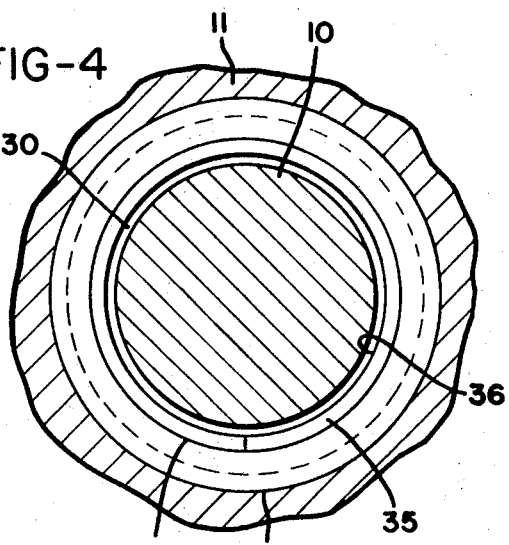
FIG. 4 is a view similar to FIG. 2 illustrating the relative position of the parts of the seal assembly when at relatively low temperature.

The operation of the seal assembly under fluctuations in temperature can be understood with respect to FIGS. 2 and 4. As shown in FIG. 2, the ends 38 and 39 of the restrainer ring 35 are spaced, the outer periphery 35a of the ring being in contact with the inner periphery of the seal element 25. As the temperature of the seal assembly is reduced, the fluorocarbon seal element tends to shrink radially inwardly away from the wall of the housing 11 and toward the shaft 10, thus contacting the restrainer ring 35 until the ends 38 and 39 thereof are in butting engagement. Once butted, the restrainer ring prevents further contraction of the seal element even though the temperature is reduced substantially, i.e., from ambient temperature of 60° to 70° F., to −40° F. For this reason, it is preferred that the cross-sectional dimension of the restrainer ring, i.e., across the radial faces, be the same as that of the seal element so that the seal element does not "grow" over the restrainer during contraction.

Typical dimensions of the seal assembly of the present invention may be understood with reference to FIG. 3. Assuming a groove dimension of 0.095 inch depth and 0.095 inch width, the restrainer ring is approximately 0.020 inch of cross section between the inner and outer peripheral surfaces, while the seal element is a cross-sectional dimension of 0.070 inch between its inner and outer peripheral surfaces. The dimensions between the radial faces is approximately 0.080 inch. The clearance between the inside periphery 36 of the restrainer ring and the base of the groove 30 is approximately 0.015 inch while the gap between the end faces 38 and 39 of the restrainer ring is not more than about 0.020 inch at ambient temperature. Thus, assuming a seal ring having a 2-inch inside diameter, the total lineal growth in the range of 68° to 77° F., is approximately 0.0285 inch. Accordingly, within a relatively small temperature change, the normally spaced faces 38 and 39 of the ring 35 will be in butting engagement and remain in engagement as the temperature decreases below 68° F., to prevent further contraction of the seal element. Since a lineal change of 0.0285 inch represents a radial change of about 0.008 inch, it is preferred that upon installation, there be a tight fit, and preferably the interference fit with the ring being a few thousands of an inch and possibly 0.010 of an inch greater than the dimension of the housing. In this way, as the seal element contracts, it remains in sealing engagement because the restrainer ring 35 prevents further radially inward movement of the seal element. As the temperature begins to increase, the seal element grows, that is, expands both in circumference and in cross section so that sealing pressure is maintained at the higher temperature.

Figure 5:
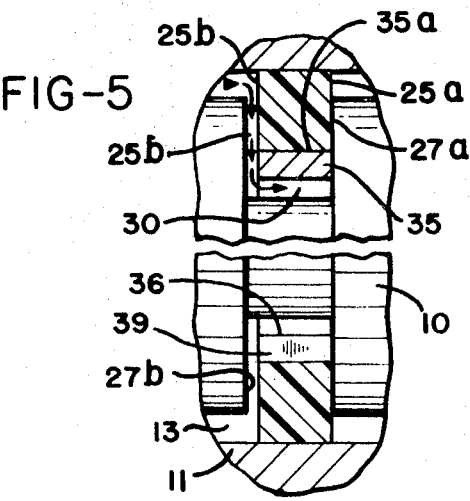
FIG. 5 is an enlarged fragmentary section of the seal assembly of FIG. 1 illustrating energization of the seal assembly by the fluid being sealed.

The operation of the seal may be understood with reference to FIGS. 1 and 5, the latter showing the flow path of fluid which is to be sealed against. Fluid flowing through chamber 17 passes between the shaft and the housing and contacts the face 25b of the seal element forcing the opposite face 25a into contact with sidewall 27a. Additionally, fluid flows into the chamber 30 and acts on the inside peripheral surface of the restrainer ring 35 to force it radially outwardly towards the housing, and thus forcing the outside peripheral surface of the seal element in tight sealing engagement with the housing.

In the case of a transmission of the type described, at cold temperatures, the hydraulic fluid is generally quite viscous so that even if the seal assembly has contracted substantially, there is very little leakage of fluid between the seal element and the housing. As the temperature of the hydraulic fluid increases, the seal element expands and seals it tightly.

A seal assembly of the type herein described is quite effective in automotive transmissions of the type described particularly because of the ability to seal in response to different pressures, which in the case of automotive transmission may vary from 0 to well over 200 p.s.i. A comparative test of the seal element of the type described against solid seal elements without a restrainer, or split seal elements, or lap seal elements indicates that the seal element of the present invention is considerably more efficient at the lower temperatures. Seal assemblies in accordance with the present invention operated quite satisfactorily in a static and dynamic seal test and at temperatures as low as −40°, and at temperatures as high as 300° F.

It is preferred in accordance with the present invention that the seal element be of polytetrafluoroethylene, preferably filled with a finely divided material such as glass, molybdenum, graphite, bronze, coke flour, asbestos, copper or mixtures thereof. A particularly good seal element has been obtained with the use of finely divided glass present in an amount of 15 percent by weight. In view of the high temperature capability of polytetrafluoroethylene as opposed to the fluorocarbon copolymer previously mentioned, polytetrafluoroethylene offers a distinct advantage.

The seal assembly of the present invention is of relatively simple construction and seals efficiently over a wide range of temperatures. The restrainer ring, which is not an energizing member operates to assure proper sealing at low temperatures by preventing contraction of the seal element. In effect, the restrainer ring is functional primarily at low temperatures.

While the form of apparatus herein described constitutes a preferred embodiment of the present invention, it is to be understood that this invention is not limited to this precise form of apparatus and that changes may be made therein without departing from the scope of the invention which is defined in the appended claims.

What is claimed is:

1. In a seal assembly for use over a wide range of temperatures for establishing and maintaining a seal between a relatively movable shaft and a housing by being energized into sealing engagement by the fluid to be sealed, and wherein said shaft includes groove means having a base of a predetermined depth and sidewalls spaced a predetermined width for reception of said seal assembly, the improvement comprising a continuous annular fluorocarbon seal element having spaced radial faces received within said groove means and having an outer peripheral surface in sealing contact with said housing, the inner peripheral dimension of said seal element being less than the diameter of said shaft and greater than the diameter of the base of said groove to provide an overlapping area between said radial faces and the opposed sidewall while providing an annular chamber between the inner peripheral surface of said seal element and the base of said groove, the cross-sectional dimension of said seal element being less than the width of said groove so that fluid pressure is operative to urge one of said radial faces into sealing engagement with the opposed sidewall in said overlapping areas, generally annular restrainer means received within said chamber and concentrically arranged with respect to said seal element, said restrainer means being formed of a material having a coefficient of thermal expansion less than that of said sealing element, said restrainer means including an outer peripheral surface in opposed relation to said inner peripheral surface of said seal element and an inner peripheral surface which is spaced from the base of said groove, said restrainer means being split to provide a gap between normally spaced circumferentially disposed radial end faces at ambient temperatures of 60° to 70° F., said gap between said radial end faces being dimensioned and coordinated with the size of the seal element and the coefficient of thermal expansion of said restrainer means such as to maintain sealing contact of said seal element and said housing as the temperature drops below a predetermined minimum from ambient temperatures, said seal tending to contract in response to reduction in temperature from ambient temperatures whereby the outer periphery thereof is spaced from said housing, and said restrainer ring being operative to contract in response to reduction in temperature until said spaced faces are in butting engagement preventing further contraction of said seal element and maintaining said seal element in sealing engagement with said housing.

2. The seal assembly as set forth in claim 1 wherein said seal element is polytetrafluoroethylene.

3. The seal assembly as set forth in claim 1 wherein said seal element is polytetrafluoroethylene filled with a material selected from the group consisting of glass, molybdenum, graphite, bronze, coke flour, asbestos, copper and mixtures thereof.

4. The seal assembly as set forth in claim 2 wherein said polytetrafluoroethylene is filled with 15 percent glass.

5. The seal assembly as set forth in claim 1 wherein said restrainer ring is metallic.

6. The seal assembly as set forth in claim 1 wherein the cross-sectional dimension of said seal element is at least 50 percent the width of said groove.

7. The seal assembly as set forth in claim 6 wherein the cross-sectional dimension of said restrainer ring is at least equal to that of said seal element.

8. A seal assembly as set forth in claim 1 wherein said shaft is rotatable relative to said housing.

9. A seal assembly as set forth in claim 1 wherein said shaft reciprocates relative to said housing.

10. A seal assembly as set forth in claim 6 wherein the inner peripheral surface of said restrainer ring is in spaced relation to the base of said groove in the contracted condition of said ring.

UNITED STATES PATENT OFFICE
CERTIFICATE OF CORRECTION

Patent No. 3,612,545      Dated October 12, 1971

Inventor(s) Robert S. Storms

It is certified that error appears in the above-identified patent and that said Letters Patent are hereby corrected as shown below:

Column 1, lines 19, 20 and 22, "$10^{15}$" should be --$10^{-5}$--;
Column 1, line 34, the following table should be inserted

| | |
|---|---|
| 77 to 32°F | $11.1 \times 10^{-5}$ |
| 50 to 68°F | $8.9 \times 10^{-5}$ |
| 68 to 77°F | $43.0 \times 10^{-5}$ |
| 77 to 86°F | $8.9 \times 10^{-5}$ |
| 77 to 302°F | $7.5 \times 10^{-5}$ |

Column 2, line 12 "wit" should be --with--.

Signed and sealed this 2nd day of May 1972.

(SEAL)
Attest:

EDWARD M. FLETCHER, JR.
Attesting Officer

ROBERT GOTTSCHALK
Commissioner of Patents